US008204801B2

(12) United States Patent  
Lin-Hendel

(10) Patent No.: US 8,204,801 B2  
(45) Date of Patent: Jun. 19, 2012

(54) SYSTEM AND METHOD FOR INTERACTIVE, COMPUTER-ASSISTED OBJECT PRESENTATION

(76) Inventor: Catherine Lin-Hendel, Los Gatos, CA (US)

( * ) Notice: Subject to any disclaimer, the term of this patent is extended or adjusted under 35 U.S.C. 154(b) by 0 days.

(21) Appl. No.: 12/464,047

(22) Filed: May 11, 2009

(65) Prior Publication Data

US 2009/0281926 A1 Nov. 12, 2009

Related U.S. Application Data

(63) Continuation of application No. 09/628,773, filed on Jul. 29, 2000, now Pat. No. 7,542,920.

(60) Provisional application No. 60/146,702, filed on Jul. 30, 1999.

(51) Int. Cl.
*G06Q 30/00* (2006.01)

(52) U.S. Cl. ..................................... 705/27.2

(58) Field of Classification Search .............. 705/26, 705/27, 26.1, 26.2, 26.25, 26.3, 26.35, 26.4, 705/26.41–26.44, 26.5, 26.61–26.64, 26.7, 705/26.8, 26.81, 26.82, 26.9, 27.1, 27.2
See application file for complete search history.

(56) References Cited

U.S. PATENT DOCUMENTS

| | | | | |
|---|---|---|---|---|
| 5,063,507 A | * | 11/1991 | Lindsey et al. | 705/37 |
| 5,196,838 A | | 3/1993 | Meier et al. | 340/724 |
| 5,485,174 A | | 1/1996 | Henshaw et al. | 345/123 |
| 5,517,605 A | * | 5/1996 | Wolf | 1/1 |
| 5,621,430 A | | 4/1997 | Bricklin | 345/119 |
| 5,664,115 A | * | 9/1997 | Fraser | 705/37 |
| 5,689,284 A | | 11/1997 | Herget | 345/145 |
| 5,749,082 A | | 5/1998 | Sasaki | 707/508 |
| 5,793,365 A | | 8/1998 | Tang et al. | 345/329 |
| 5,835,896 A | * | 11/1998 | Fisher et al. | 705/37 |
| 5,874,936 A | | 2/1999 | Berstis et al. | 345/123 |
| 5,877,761 A | | 3/1999 | Shoji et al. | 345/341 |
| 5,890,138 A | | 3/1999 | Godin et al. | 705/26 |
| 5,892,498 A | | 4/1999 | Marshall et al. | 345/123 |
| 5,905,973 A | | 5/1999 | Yonezawa et al. | 705/27 |

(Continued)

OTHER PUBLICATIONS

Gavron et al., How to Use Microsoft Windows NT 4 Workstation, Ziff-Davis Press, pp. 105, 1996.

(Continued)

*Primary Examiner* — Naeem Haq
(74) *Attorney, Agent, or Firm* — Mahamedi Paradice Kreisman LLP; Zurvan Mahamedi

(57) ABSTRACT

A system and method for interactive, computer-assisted object presentation in which object information is displayed in one more arrays. In some embodiments, object information is displayed in a two dimensional array wherein displayed object information can be selected by a user. In response to the selection, in some embodiments additional information is displayed about an object corresponding to the selected information. In some embodiments, the additional information includes one or more of a link to permit a user to buy the object (e.g., from an e-commerce web site) and a link to bid on the object (e.g., in an on-line auction). In some embodiments, at least a subset of the two arrays scrolls without user interaction. In some embodiments, object information is displayed in an first array from which a user can select multiple elements. In response to the selection, in some embodiments a second array is displayed with information about the multiple selected elements from the first array. In some embodiments, the information displayed in the second array includes status information about the selected elements, such as price changes.

5 Claims, 16 Drawing Sheets

U.S. PATENT DOCUMENTS

| | | | |
|---|---|---|---|
| 5,954,640 A | 9/1999 | Szabo | 600/300 |
| 5,966,122 A | 10/1999 | Itoh | 345/328 |
| 5,970,471 A * | 10/1999 | Hill | 705/26 |
| 5,974,398 A | 10/1999 | Hanson et al. | 705/14 |
| 6,016,494 A | 1/2000 | Isensee et al. | 707/102 |
| 6,026,376 A | 2/2000 | Kenney | 705/27 |
| 6,026,377 A | 2/2000 | Burke | 705/27 |
| 6,058,379 A | 5/2000 | Odom et al. | 705/37 |
| 6,078,924 A * | 6/2000 | Ainsbury et al. | 1/1 |
| 6,147,683 A | 11/2000 | Martinez et al. | 345/341 |
| 6,167,382 A | 12/2000 | Sparks et al. | 705/26 |
| 6,188,398 B1 | 2/2001 | Collins-Rector et al. | 345/327 |
| 6,208,770 B1 | 3/2001 | Gilman et al. | 382/305 |
| 6,211,874 B1 | 4/2001 | Himmel et al. | 345/340 |
| 6,212,536 B1 | 4/2001 | Klassen et al. | 707/513 |
| 6,215,490 B1 | 4/2001 | Kaply | 345/340 |
| 6,222,541 B1 | 4/2001 | Bates et al. | 345/341 |
| 6,249,773 B1 | 6/2001 | Allard et al. | 705/26 |
| 6,264,104 B1 | 7/2001 | Jenkins et al. | 235/383 |
| 6,282,362 B1 * | 8/2001 | Murphy et al. | 386/224 |
| 6,300,947 B1 | 10/2001 | Kanevsky | 345/333 |
| 6,313,854 B1 | 11/2001 | Gibson | 345/788 |
| 6,321,991 B1 | 11/2001 | Knowles | 235/472.01 |
| 6,330,575 B1 | 12/2001 | Moore et al. | 707/513 |
| 6,334,145 B1 | 12/2001 | Adams et al. | 709/217 |
| 6,345,764 B1 | 2/2002 | Knowles | 235/472.01 |
| 6,360,205 B1 | 3/2002 | Iyengar et al. | 705/5 |
| 6,363,419 B1 | 3/2002 | Martin, Jr. et al. | 709/219 |
| 6,369,811 B1 | 4/2002 | Graham et al. | 345/349 |
| 6,401,077 B1 | 6/2002 | Godden et al. | 705/26 |
| 6,437,811 B1 | 8/2002 | Battles et al. | 345/835 |
| 6,457,026 B1 | 9/2002 | Graham et al. | 707/512 |
| 6,462,752 B1 | 10/2002 | Ma et al. | 345/684 |
| 6,470,323 B1 * | 10/2002 | Suzuki et al. | 705/26.1 |
| 6,480,197 B1 | 11/2002 | Bluthgen et al. | 345/467 |
| 6,513,035 B1 | 1/2003 | Tanaka et al. | 707/3 |
| 6,538,698 B1 | 3/2003 | Anderson | 348/333.05 |
| 6,580,441 B2 | 6/2003 | Schileru-Key | 345/805 |
| 6,912,694 B1 | 6/2005 | Harrison et al. | 715/784 |
| 6,940,488 B1 * | 9/2005 | Siddiqui et al. | 345/163 |
| 7,409,643 B2 | 8/2008 | Daughtrey | 715/763 |
| 7,418,483 B2 | 8/2008 | Hess et al. | 709/219 |
| 2001/0042020 A1 * | 11/2001 | Schachne et al. | 705/26 |
| 2003/0083957 A1 | 5/2003 | Olefson | 705/27 |
| 2007/0106938 A1 * | 5/2007 | Greaves et al. | 715/700 |

OTHER PUBLICATIONS

Kaiser J., Hot Picks, American Association for the Advancement of Science, Washington, Jan. 22, 1999, 1 page.
Spangard M., "Mona Lisa" Only a Click Away With Virtual Art Galleries, Greensboro News Record, Greensboro, NC, p. D6, Sep. 21, 1998.
Office Action; U.S. Appl. No. 09/544,036; Oct. 4, 2002.
Final Office Action; U.S. Appl. No. 09/544,036; Jun. 18, 2003.
Advisory Action; U.S. Appl. No. 09/544,036; Nov. 14, 2003.
Office Action; U.S. Appl. No. 09/544,036; Mar. 30, 2004.
Final Office Action; U.S. Appl. No. 09/544,036; Apr. 5, 2005.
Office Action; U.S. Appl. No. 09/544,036; Nov. 29, 2005.
Final Office Action; U.S. Appl. No. 09/544,036; Jun. 2, 2006.
Examiner's Answer; U.S. Appl. No. 09/544,036; Apr. 2, 2007.
Decision on Appeal; U.S. Appl. No. 09/544,036; Nov. 19, 2008.
Office Action; U.S. Appl. No. 09/544,036; Mar. 18, 2009.
Office Action; U.S. Appl. No. 09/628,773; Jun. 18, 2003.
Office Action; U.S. Appl. No. 09/628,773; Feb. 4, 2004.
Final Office Action; U.S. Appl. No. 09/628,773; Aug. 10, 2004.
Office Action; U.S. Appl. No. 09/628,773; Jan. 23, 2007.
Office Action; U.S. Appl. No. 09/628,773; Aug. 10, 2007.
Office Action; U.S. Appl. No. 09/628,773; Jan. 25, 2008.
Notice of Allowance; U.S. Appl. No. 09/628,773; Aug. 5, 2008.
Notice of Allowance; U.S. Appl. No. 09/628,773; Jan. 26, 2009.
Office Action; U.S. Appl. No. 09/631,238; Sep. 5, 2002.
Office Action; U.S. Appl. No. 09/631,238; Mar. 23, 2007.
Final Office Action; U.S. Appl. No. 09/631,238; Oct. 12, 2007.
Office Action; U.S. Appl. No. 09/631,238; Jan. 29, 2008.
Final Office Action; U.S. Appl. No. 09/631,238; Jul. 28, 2008.
Notice of Allowance; U.S. Appl. No. 09/631,238; Apr. 3, 2009.
Office Action; U.S. Appl. No. 10/052,692; Aug. 25, 2004.
Final Office Action; U.S. Appl. No. 10/052,692; Mar. 3, 2005.
Examiner's Answer; U.S. Appl. No. 10/052,692; Sep. 28, 2005.
Decision on Appeal; U.S. Appl. No. 10/052,692; Aug. 31, 2006.
Office Action; U.S. Appl. No. 10/052,692; Dec. 7, 2006.
Final Office Action; U.S. Appl. No. 10/052,692; Jun. 20, 2007.
Notice of Allowance; U.S. Appl. No. 10/052,692; Sep. 14, 2007.
Office Action; U.S. Appl. No. 11/924,582; Jan. 12, 2009.

* cited by examiner

| | HOME LISTINGS BUYERS SELLERS SEARCH HELP NEWS/CHAT SITE MAP |

•
•
•

Featured Auctions in Furniture

Current Auctions

| Item | Price | Bids | Ends PDT |
|---|---|---|---|
| *NEW!* 18th Century Chippendale Desk Rhode Island PIC | $1000.00 | - | 07/22 12:42 |
| *NEW!* OAK ROCKER–CURVED SLAT BACK~ARMS ~SOFT MISSION PIC | $59.00 | - | 07/25 11:11 |
| *NEW!* GREAT VICTORIAN CARVED THRONE CHAIR PIC | $40.00 | - | 07/22 11:03 |

•
•
•

(PRIOR ART)

FIG. 1B1

| | | | |
|---|---|---|---|
| OAK BOOKCASE/CHINA CABINET~STRETCHER BASE~2 D | $99.00 | - | 07/25 08:14 |
| wonderful 4 dr. silver chest | $177.50 | 2 | 07/22 07:14 |
| PAIR OF SOLID MAHOGANY SEWING/NITE/ SIDE STAND | $152.50 | 6 | 07/21 21:51 |
| CARVED, CLAW FOOT ZEBRA MAHOGANY CENTER TABLE | $152.50 | - | 07/21 21:38 |
| FOUR PERIOD JACOBEAN HEAVY CARVED CHAIRS | $100.00 | 9 | 07/21 21:26 |
| SUPER TURN OF THE CENTURY OAK VICTORIAN SECRETARY | $680.00 | 11 | 07/24 19:56 |

122

(PRIOR ART)

FIG. 1B2

| All Items in Furniture |||||
|---|---|---|---|---|
| Current Auctions |||||
| For more items in this category, click these pages: <br> = 1 = 2  3  4  5  6 ... 20 ... 36  (next page) |||||
| Item | Price | Bids | Ends PDT ||
| MAGNIFICENT EGYPTION DINING ENSEMBEL | $5000.00 | - | 07/26 16:55 ||
| Majorelle Armoire' | $8000.00 | - | 07/26 16:51 ||
| Old Brass Ornamental Griffin Fireplace Fan | $9.99 | - | 07/23 16:51 ||
| OLD HAND CRAFTED DOLL'S WARDROBE!! | $25.00 | - | 07/23 16:43 ||
| MASSIVE CLAWFOOT OAK LAMP TABLE | $385.00 | - | 07/23 16:42 ||
| OLD HEREKE PERSIAN Oriental Rug NiceRugs | $400.00 | - | 07/26 16:30 ||
| An Encyclopedia of Desks By Mark Bridge 1988 | $9.50 | - | 07/23 16:29 ||

•
•
•

(PRIOR ART)

FIG. 1B3 eBay™

Home  Listings  Buyers  Sellers  Search  Help  News/Chat  Site Map

Subscribe now! Get your charter subscription to eBay magazine.
Give us your comments! Test drive te new, revised site.
Free escrow! Buy and sell safely with i-Escrow.

| SUPER TURN OF CENTURY OAK VICTORIAN SECRETARY |
|---|
| Item # 131862095 |

Antiques: Furniture

Description

Bid!

| | | | | |
|---|---|---|---|---|
| Currently | $899.00 (reserve met) | | First bid | $99.99 |
| Quantity | 1 | | # of bids | 16 (bid history) (with emails) |
| Time left | 9 days, 0 hours + | | Location | CANFIELD, OHIO |
| Started | 07/14/99, 19:56:34 PDT | | | ✉ (mail this auction to a friend) |
| Ends | 07/24/99, 19:56:34 PDT | | | 🎁 (request a gift alert) |
| | | | | Featured Category Auction |
| Seller | suellen0 (843) ⭐ | | | |
| | (view comments in seller's Feedback Profile) (view seller's other auctions) (ask seller a question) | | | |
| High bid | horner2 (1) | | | |
| Payment | Visa/MasterCard, Money Order/Cashiers Checks, Personal Checks. See item description for payment methods accepted | | | |
| Shipping | Seller ships internationally. See item description for shipping charges | | | |

Seller assumes all responsibility for listing this item. You should contact the seller to resolve any questions before bidding. Currency is dollar ($) unless otherwise noted.

| Description |
|---|

Reeded posts supporting shelves, stick and ball galleries, carved gingerbread, beading, ornate brass hardware, beveled mirror and original finish are the first phrases that come to mind when I think about describing this oak secretary which is truly a show stopper. The

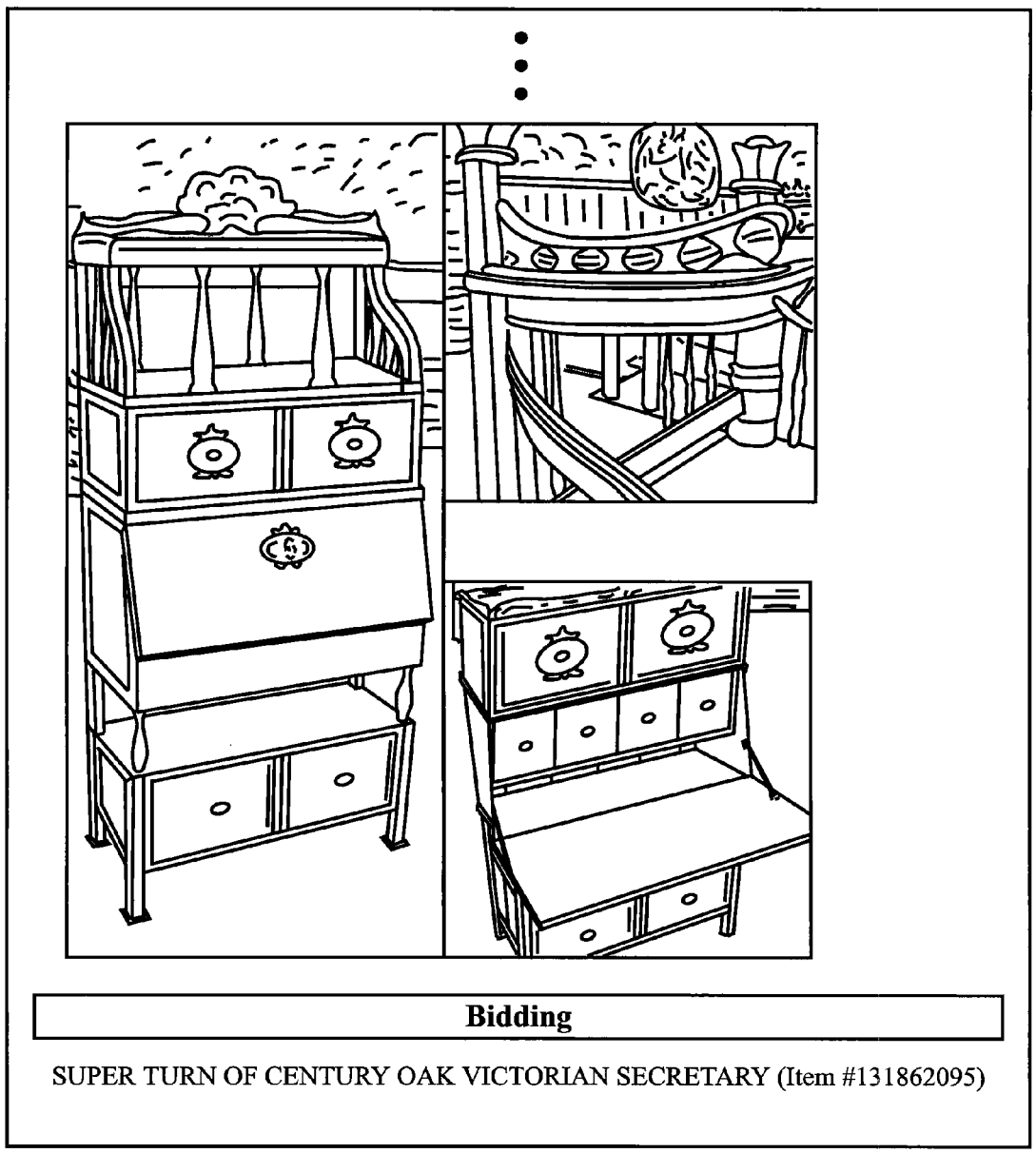
(PRIOR ART)
FIG. 1C2

Current bid  $899.00
Bid increment  $10.00
Minimum bid  $909.00
•
•
•
To finalize your bid, you will need to submit your User ID and Password in the next step. You will not be asked to enter your User ID and Password anywhere on this page.
|  | *Current minimum bid is $909.00* | review bid |
Your maximum bid.
•
•
•
 Home Listings Buyers Sellers Search Help News/Chat Site Map
Thank you for using eBay!
•
•
•
(PRIOR ART)
FIG. 1C3 amazon.com  🛒 | YOUR ACCOUNT | HELP

| WELCOME | BOOKS | MUSIC | VIDEO | TOYS & GAMES | ELECTRONICS | e-CARDS | AUCTIONS |

| AUCTION SEARCH | BROWSE CATEGORIES | STARTING SEARCHES | YOUR AUCTIONS | SELL YOUR ITEMS NOW |

Browse Categories

Auctions / Antiques

- General
- Ancient World
- Books & Manuscripts
- Cameras
- Folk Art
- Metalware
- Musical Instruments

- Post-1900
- Pre-1900
- Prints
- Reproductions
- Scientific Instruments
- Textiles & Linens

Featured Auctions

| Picture | Auction Name | Current Bid | Bids | Remaining Time |
|---|---|---|---|---|
| 📷 | 1518 BOOK RELIGIOUS SERMONS 2 BOOKS IN ONE REALLY NICE SHAPE | $510.00 | 20 | 0 days, 2 hrs |
| 📷 | MAGNIFICENT OLD PERSIAN RUG | $202.50 | 19 | 0 days, 3 hrs |
| 📷 | BEATLES~ORIGINAL~1st~US~TOUR~COIN~MINT~SEALED~IN~1964~ | $14.00 | 5 | 0 days, 5 hrs |

The Portal to Good Living

BonVivre

- Shopping
- Auctions, Sales
- Build to Order
- Personal Concierge
- Registration
- My Folder
- Listings
- Search
- Communications Concierge
- Executive Web Concierge
- Articles, Magazines
- News, Events
- Chat, Forum
- Bulletin Board
- RFP, RFQ
- E-Mail
- Calendar
- Reminder
- AdressBook
- Net2Phone
- Click2Dial BonVivre.com | Auctions
Local Time: 7/27/1999; 10:40   24A   24B   24C

50

| Picture | Description | Last Update 7/27/99; 10:30 |
|---|---|---|
| | | Auction Bids |
| [painting image] | *Egli Ucelli* Late 19th century oil on canvas in the style of Tomasso Brindisi. 28 by 38 inches in a gift fram dating from 1880. Preauction Estimated Price: $ | Current Bid: $17,000.00 Quantity: 1 Ends Started SSL Protection Bid Amount: $ Auto Bid Max: $ Membership ID | Starting Bid: $14,0 Bid Increment: $50 Mail this auction to Request a gift alert E-mail to merchant |
| ON ← 40 [car image] | Jaguar S-Series 1999 Jaguar New series luxury car. | Current Bid: $35,000.00 Quantity: 1 Ends Started SSL Protection Bid Amount: $ Auto Bid Max: $ Membership ID | Starting Bid: $30,0 Bid Increment: $1,0 Mail this auction to Request a gift alert E-mail to merchant |
| [carpet image] | Algarve; Dark Olive 2120G Algarve needlepoint wool carpet features dark olive field with Caribbean blue, dusty rose, and burnt tangerine flowers. | Current Bid: $1,100.00 Quantity: 1 Ends Started SSL Protection Bid Amount: $ Auto Bid Max: $ Membership ID | Starting Bid: $30,0 Bid Increment: $1,0 Mail this auction to Request a gift alert E-mail to merchant |

54, 56, 52

Coming Soon
[car] 7/28/99; 1:15 pm
[device] 7/28/99; 3:45 pm
[rug] 7/28/99; 5:15 pm
[stove] 7/28/99; 6:30 pm Have a question, comment or suggestion?

Submit   Reset

| Merchant Services | FAQ | Help | Site Map | Home | Top |
Phone: (408) 354-6293   Fax: (408) 354-6273   18850 Blythswood Dr., Los Gatos, CA 95030

© 1998, 1999. All rights reserved. Maka Communications & Computing

FIG. 4D

SYSTEM AND METHOD FOR INTERACTIVE, COMPUTER-ASSISTED OBJECT PRESENTATION

RELATED APPLICATIONS

This application is a continuation of U.S. patent application Ser. No. 09/628,773 filed Jul. 29, 2000, now U.S. Pat. No. 7,542,920 which claims priority to Provisional U.S. Patent Application No. 60/146,702, filed Jul. 30, 1999, the full disclosure of which are incorporated herein in its entirety.

PRIORITY NOTICE

This Non-Provisional U.S. Patent Application claims the benefit of the Jul. 30, 1999 filing date of Provisional U.S. Patent Application Ser. No. 60/146,702.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

The present invention relates to novel methods and apparatus for conducting, presenting, monitoring, and tracking auctions on-line, for pure Internet auctions, and real-time presentation of physical auctions. The methods and apparatus disclosed in this application can also be use in all on-line object and catalogue presentations and other E-commerce sales and advertising channels and mechanisms.

DESCRIPTION OF RELATED ART

Traditional physical auctions of goods and services take place as events with defined time periods, at defined and limited physical locations where the buyers, on-lookers, commissioned sellers, sellers, trained auctioneers, and the goods gather. In some instances, with pre-arranged facility, remote buyers can be linked at real-time to the auction, via private or public radio, television, or telephone network, and call-in bids remotely over telephone connections. The real-time broadcast or narrowcast of an auction through radio, television, or telephone networks can be costly, and access is usually limited to specific locations/rooms with the relays or connections. Therefore, the conventional physical auction events are considered restricted to a limited buyer audience who can either physically attend the auction at location, during that specific time frame, or be present at a remotely linked facility also at that specific time frame. The costly, time specific physical gathering of a "live" auction event is only worthwhile or feasible for both the auctioneer's and the buyers' sides, if, and only if there is a large number of items to be sold. However, only one item can be "auctioned" at a time, in a physical live auction event. Thus, each item has a very limited time allotment to be on the auction stage.

Some items stimulate more interest than others in an unpredictable way in a time limited physical live auction event. The buyers come to, and leave the event also in somewhat of unpredictable ways, it is difficult for a live auction event to publish and commit to a fixed item-by-item schedule in a catalogue ahead of the event. Therefore, buyers do not know what item would be auctioned at what time frame, and what items would be auctioned next even while at the auction. Buyers do travel to the location; frequently to miss the items most interested, unless he or she is willing to arrive on-time, and commit to sit through the entire auction event without breaks. Wealthy collectors or dealers often go through the preview, note the interested items manually, and give instructions as to the highest price they would be willing to pay for each item to hired professional buyers/bidders to attend the event and do the bidding. The process is manual, labor intensive, and somewhat risky for both the hiring collectors and their hired buyers.

The new Internet "cyber" Auction format, on the other hand, allows buyers, sellers, and spectators to browse and search for information, descriptions, and auction status of goods, and submit bids without geographical or strict time limitations. All items, independently, can be "auctioned" during the same time period, in parallel, and simultaneously. The duration for each "item" in "open auction" is largely defined by the owner of the item or his agent, and independent of other items. The duration is measured in days or weeks, rather than the minutes as custom and necessary in a physical live auction. The beginning and ending times of "open auctions" are published individually in each item's entry. Data entry is left to the owners of objects with templates provided by the sites. The sites has no organized data on what objects may become available for auction, and do not publish up-coming auctions.

At Ebay.Com (FIG. 1, Jul. 15, 1999), the largest Internet auction site, millions of objects are "auctioned" at any given time. Search for goods is accomplished through browsing the extensive category trees/paths (FIG. 1A), or entering item type or name through a "search" function. The auction item list obtained through category browsing is astoundingly large, on the order of hundreds to thousands of items, over many tens of web-pages (each can be more than one physically printed page), listed with abbreviated one-line entry or a thumbnail entry for each item. FIGS. 1B1 and 1B2 are 2 pages of a list of "Featured" furniture auction items, and FIG. 1B3 is the 1st page of 37 pages of 1761 furniture items being auctioned on the Ebay.Com site on Jul. 15, 1999. Note that the right most column indicates the "ending time" of the auctions, mostly ending around July 22 through July 25, a ten day auction time span, impossible to accommodate in conventional "live" auctions, which measure auction time for each item in minutes. Choosing items out of such a large list can only be accomplished by reading through tens or hundreds of one-line abbreviated descriptions of each item, and choosing one item from the list to view the more detailed information about the item, one-at-a-time. Once an item is thus chosen, the browser/buyer clicks on the line or thumbnail entry of the item on the list (see FIG. 1B2, item 122 on the page), and waits for its descriptions to be sent to the screen from the remote site server (FIGS. 1C1 through 1C3.) If the buyer wishes to view more items from the list of hundreds of items, it can only be done, again, one-at-a-time, by clicking "back" to the list, and choose another item, click on the item, wait for page download, thus repeating. When the buyer is viewing information about one interested item, the information for other items previously viewed are gone from the screen The buyer must print all information of every item, before clicking "back" to the list to access information of another item. The comparison between similar or interested items can only be reasonably done by reading the volume of printout pages of these items. At the mean time, the auction status and current high-bid of some items may have already changed. Although such process is tedious and time consuming, for many people, it is still preferred over making the effort required to attend a conventional physical "live" auction.

Bidding is entered electronically on a bidding screen that usually follows the bidding information, object description, and photograph(s) of the object. For a single item auction, the bid entered at any given time must "beat" the current highest bid to be relevant and logged into bidding history as the updated highest bid. For a "Dutch Auction;" where multiple numbers of an identical item are auctioned, the bid must be higher than the current lowest valid bid. Every "current highest bid" is there to be outbid before the "auction time" is still open. It is highly desirable to a serious buyer to monitor the bidding status, and bid only when "closing" time comes near.

With the current state of the art in online auction, such monitoring is accomplished through manually logging onto the site at any particular time, go to the pages where a particular item of interest is described, look up the bidding status of that particular item, and the closing time of this particular auction. Set an alarm clock for certain intervals before its "closing time," for final check, which could be days later. At any moment between the time you last manually checked the auction status, and the time of the alarm, the auction status can only be updated by manually and periodically logging on to the site, and going to the particular pages describing the item, one item at a time. If the buyer is interested in a number of items, the process is extremely tedious, time consuming, and unreliable. One can enter a bid, request email notification from the site when the bid is "outbid" by another buyer. However, this is a one-time only notification. To be notified again, one must enter another bid that beats the current highest bid, and risking buying the object at that price, or to be outbid again.

For a physical live auction event, there is no way to monitor the event other than being physically present.

FIGS. 2A-2B are screen prints of Auction.Yahoo.Com, and FIGS. FIGS. 3A and 3B are screen prints of AmazonAuction.Com, illustrating the two sites' identical formats to Ebay.Com. This universal Internet Auction Format is used with very minor variations on the theme in all state-of-the-art auction sites. Basically, the home pages of the auction sites contain a primary category listing, a "featured" listing, a "search" entry box, and some informational/promotional icons, textual descriptions, and links. Clicking on a category title on the primary category list brings the next page containing the listing of the next level of categories under that particular category, and a list of the "featured" items in that category. Clicking on one "featured" title brings information about that one particular "featured" item. Similarly, clicking on brief descriptions of promotional or informational entries and icons brings more detailed information about the entry. Clicking on a subcategory brings the listing of the next level subcategories and the "featured" items in that subcategory, until the particular category path is exhausted. Then, all items under that end category is listed over many web pages, accessible one web-page at a time, each containing more than one physical print page. Links to information of Items listed on a web page are accessible also one-item-at a time. Entering a search word or a search phrase brings a list of items that contain the word or phrase in the tagging header or in the description.

Although facilitated to provide simultaneous auctions, Internet format of the known-art does not allow viewing, monitoring, or tracking of simultaneous auctions of multiple items. As described previously, a buyer can elect to visit the "biding" screen, enter a bid for each interested item, and request to have electronic-mail (email) sent to his/her email account as a one-time notification when a bid is outbid. Or the buyer can periodically log-on to the auction site, and manually search and browse for status information of interested items, one at a time.

SUMMARY OF THE INVENTION

The present invention relates to novel methods and apparatus for conducting, presenting, monitoring, and tracking auctions on-line, for pure Internet auctions, and for real-time internet presentation of live physical auctions. The "current" auction objects are presented in moving graphical arrays that can be sorted by columns or rows, commanded to moved to show items beyond the screen, or stopped to select individual items to obtain further information or to be monitored and tracked. The "up coming" objects that are soon to be "open" for bidding are shown on a separate strip on the screen. The strip "cycles" onto the screen to accommodate displaying more objects, than the screen size can accommodate. The moving strip can also be activated to step in the opposite direction, or stopped for detailed view, or selected for monitoring, tracking, or to obtain further information. The displaying and selection method and apparatus can also be used for other e-commerce sales channels and catalogs.

Selected objects from different categories, or even different sites can be monitored and tracked on the same screen.

Self-rotating, automated Virtual Reality is used to display three-dimensional objects. Split screen allows video broadcasting, narrow casting, or streaming of "live auction" events alongside detailed still or virtual reality images of auctioned objects, their descriptions, and the bidding entry form, as well as the running strip cataloguing the upcoming lots/items.

The methods and apparatus disclosed in this application can also be use in other types of on-line object and catalogue displays, and other E-commerce channels and services, in addition to the auction format.

BRIEF DESCRIPTION OF THE DRAWINGS

FIG. 1A also shows the home page, with its $1^{st}$ level categories listed on the left side of the page, the "featured" items listed in the middle of the page, and the "search" box at top center of the page.

FIGS. 1B1 and 1B2 are one-line descriptions of "featured" items in the Furniture category.

FIG. 1B3 is the first of the 37 web-pages listings of 1,761 furniture items currently being auctioned on the site.

FIGS. 1C1 to 1C3 are detailed description and bidding status of item 122, Super Turn of Century Oak Victorian Secretary, listed on FIG. 1B2.

FIG. 3B lists the second level categories under the "Antiques" category, and the "Featured Auctions" in the "Antiques" category.

FIGS. 4A-4D: An example of an On-Line Auction presentation implemented with the current invention.

FIG. 4A shows the "featured", and "search," or "category" browsing results are shown in a graphical array, with multiple-select capabilities. The "upcoming" auctions are announced in a cycling or stationary (scrolled to view) margin-strip at the right side. The "present" auctions are presented in rows.

Each row of the array can advance to left, back to right, continually move (GO button) to show more items, or stop, at command by clicking on the commend buttons at the left margin of the row. The "upcoming" column on the right has similar functions. The movement for the column is up-down movement.

In this particular presentation example, we have chosen 3 categories and the "featured." The same method and apparatus can present items of the same category, or the subcategories within a category, for example, separating sports cars of different manufacturer.

FIG. 4B shows the screen shot of the Auction home-page screen at some time later. Due to exercising the moving functions, some items have changed positions on the array, some items have left the screen, and some items not shown in 4A appear on the screen.

FIG. 4C shows the selected items from 4A and 4B appear on a monitoring screen. The screen is automatically tracked/updated by synchronizing with the server data at user programmable intervals. Object that should be seen from all sides has an "On" button in a portion of its still image. Clicking the "ON" button turns on the Virtual Reality with automated rotation as well as mouse driven rotation features. The "ON" button can be replaced by "VR" or any other form that representing turning on "Virtual Reality." Detailed information for each monitored object can be called individually by clicking on the "Detail" button, or selectively and collectively by clicking the "select" boxes, and submitting requests to the server after completing the selection process. The object positioning in the array can be sorted with various criteria at user request or default setting. The "alert" can also be programmed, for example, to surround "End Time" box with small blinking stars, or any other attention causing signal, to signal the end of "open" auction within 30 minutes (or an hour), and blinking red stars for "My bid" button when "my bid" is out bid.

FIG. 4D shows selection of objects monitored in screen FIG. 4C for viewing detailed information and access bidding apparatus collectively, would bring this screen after submitting the selection. In this example, The Egli Ucelli landscape painting, the Jaguar S-series, and the Algarve rug axe selected.

Figure 5:
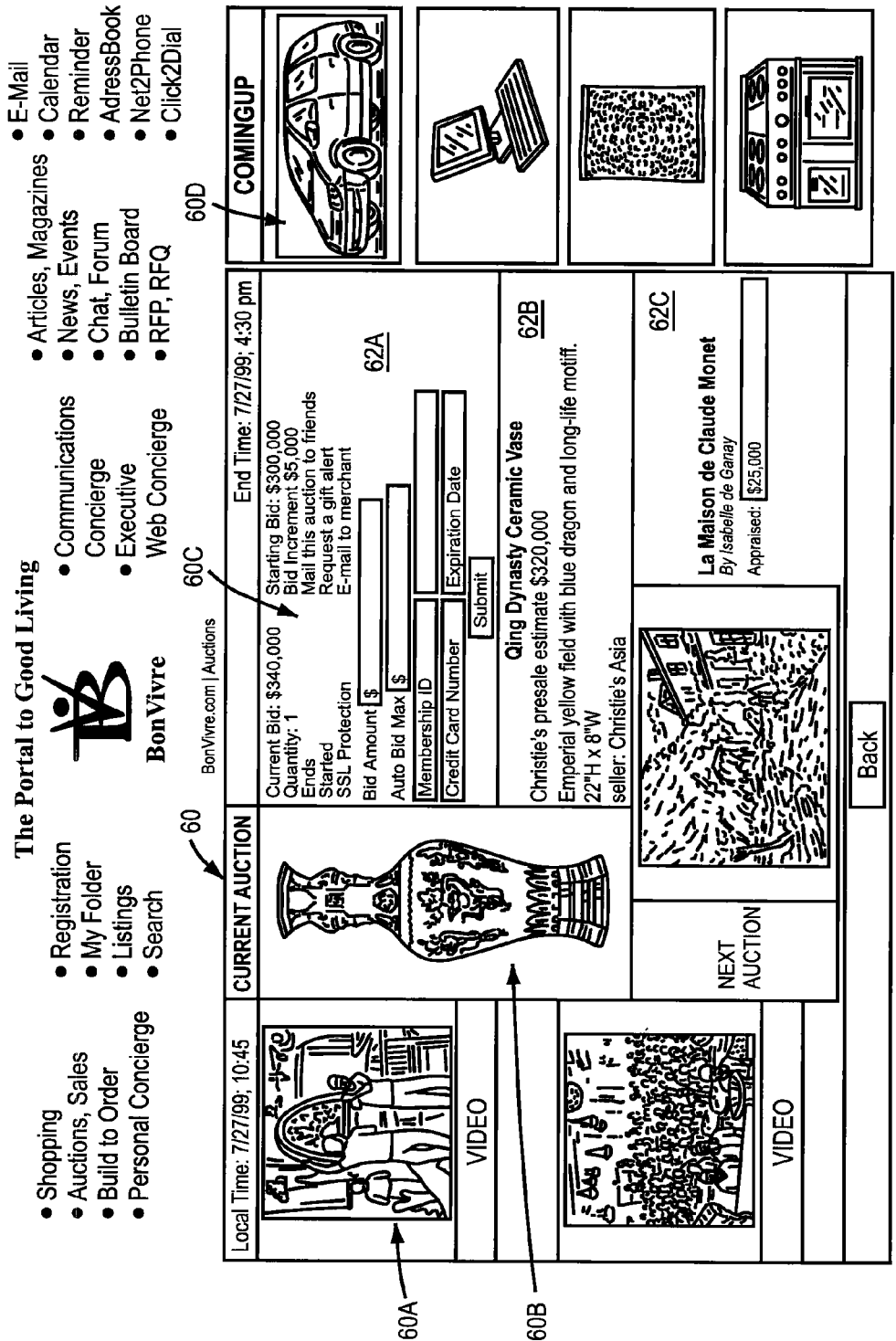

FIG. 5 shows an example of the "Live" Auction Format of the Present Invention.

DETAILED DESCRIPTION OF THE INVENTION

The present invention relates to novel methods and apparatus for conducting, presenting, monitoring, and tracking auctions on-line, for pure Internet auctions, and for real-time linking to physical auctions. The "current" auction objects are presented in moving graphical arrays that can be sorted by rows or columns, and moved bi-directionally to show more items than the computer screen size can accommodate, or stopped to select individual items to obtain further information, or to be monitored and tracked. The "up coming" objects that are soon to be "open" for bidding are shown on a separate strip on the screen. The strip and the sorted rows or columns can be commanded to "cycle" onto the screen continually to display objects beyond the screen. The moving strip can also be activated to step in both directions, and stopped for detailed view or selection for monitoring, tracking, or to obtain further information. The displaying and selection method and apparatus can also be used for displaying catalogs and other e-commerce channels and services.

Selected objects from different categories, or even different sites can be monitored and tracked on the same screen.

Self-rotating, automated Virtual Reality is used to display three-dimensional objects. Split screen allows video broadcasting, narrow casting or streaming of "live auction" events, or fashion catwalk events alongside detailed images of auctioned objects, their descriptions, and the bidding entry form, as well as the running strip cataloguing the upcoming lots/items for auction or catwalk.

The methods and apparatus disclosed in this application can also be use in other types of on-line object and catalogue displays and other E-commerce channels, mechanisms, and services in addition to the auction format.

The present invention presents objects presently open for auction in each category on a graphical array, with the "up coming auctions" running on a margin strip. A time stamp signifies the time the information is loaded to the computer at its latest synchronization/up-date. The array can be sorted by user specified or default criteria in columns or rows. Command buttons providing options allowing viewers to start, or stop the cycling, use the scroll button to scroll up or down, or left or right, to see more items. The bidder/viewer selects interested objects from the array of either the same category, or from different categories, or even from different sites, and/or the interested "upcoming" objects from the margin strip. The "auction wizard" of the current invention fetches the detailed information and enlarged graphics of the selected items from the site databases, and composes a personalized auction monitor screen for the bidder/viewer. The screen is automatically updated with new status, at user programmable intervals. If the bidder/viewer's computer is disconnected from the server, the synchronization occurs automatically upon reconnection.

Differentiated level of selections can be made, and the array presentation can be sorted by category, or with other criteria of differentiation. "Alert" is programmed to user selectable criteria, such as closing time, outbid, etc. Default setting can be provided, for example, to alert closing time in one hour or less, or outbid by others.

Dropping items from monitoring screen can also be programmed to criteria, such as highest bid going beyond a certain price, or successful final bid of another similar item, etc. Monitoring is automatically dropped when closing is over, and status sent to "closed auction report" folder.

Automated 3D Virtual Reality presentation is used to display three-dimensional objects, such as sculptures, cars, lamps, or furniture, revolving on the screen automatically. Buttons are provided to the VR presentation for viewer to elect using the mouse to rotate the object, or to resume the automated rotation. A "VR," button is provided on still images of three-dimensional objects for activating Virtual Reality presentation upon clicking.

"Split Screen" accommodates broadcasting, narrow casting, and streaming video for viewing the live auction events, alongside the web images, VR or 3D presentations of the object, detailed textual descriptions, and the online "bidding" mechanism, for linking "live auction" sessions to the on-line auction network.

Figure 1A:
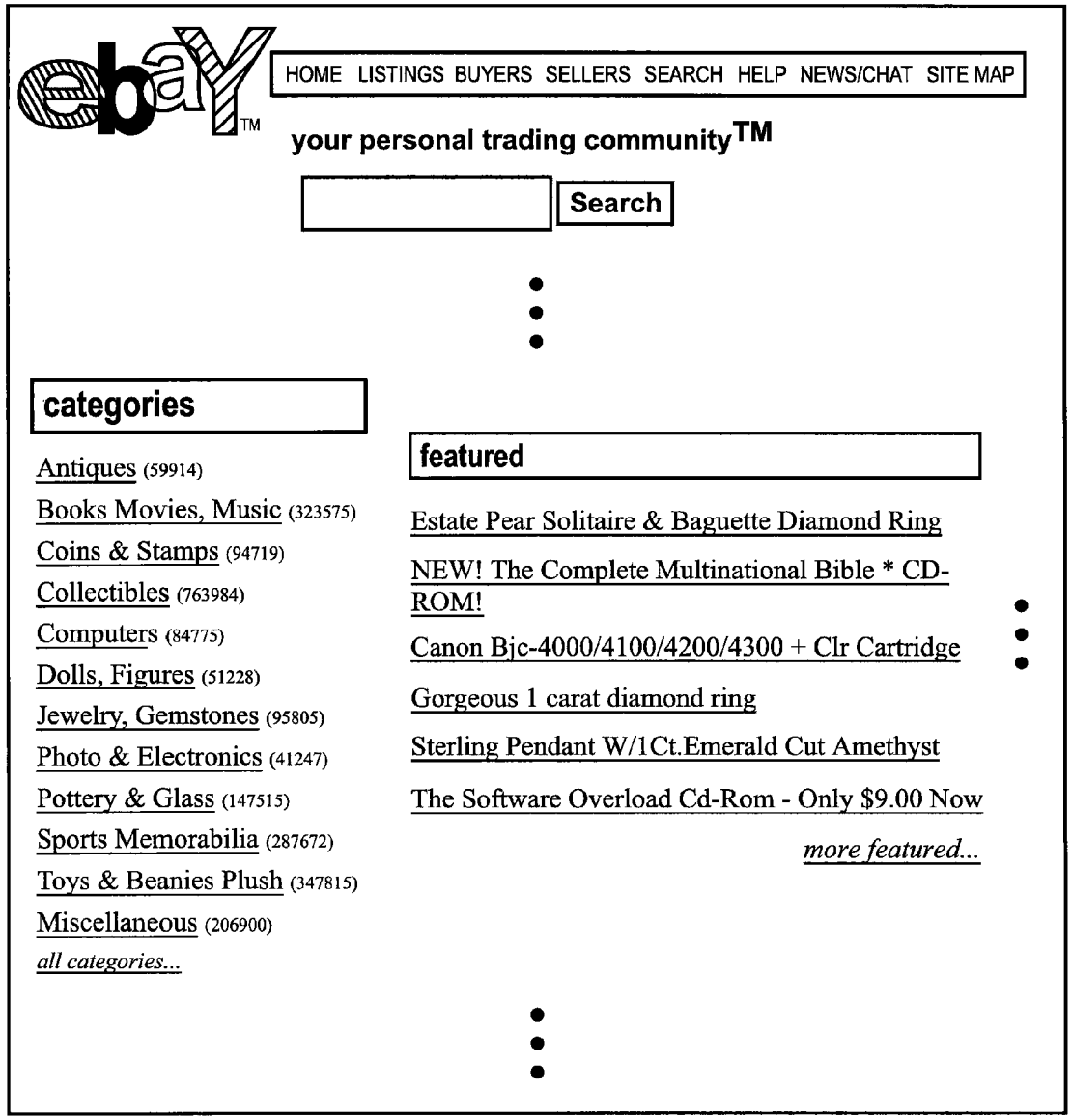
FIG. 1A: Ebay.Com. Known-Art Auction Format Only ONE link (one item)-can be clicked at any time on any page, as in all Internet web pages.
Figure 2A:
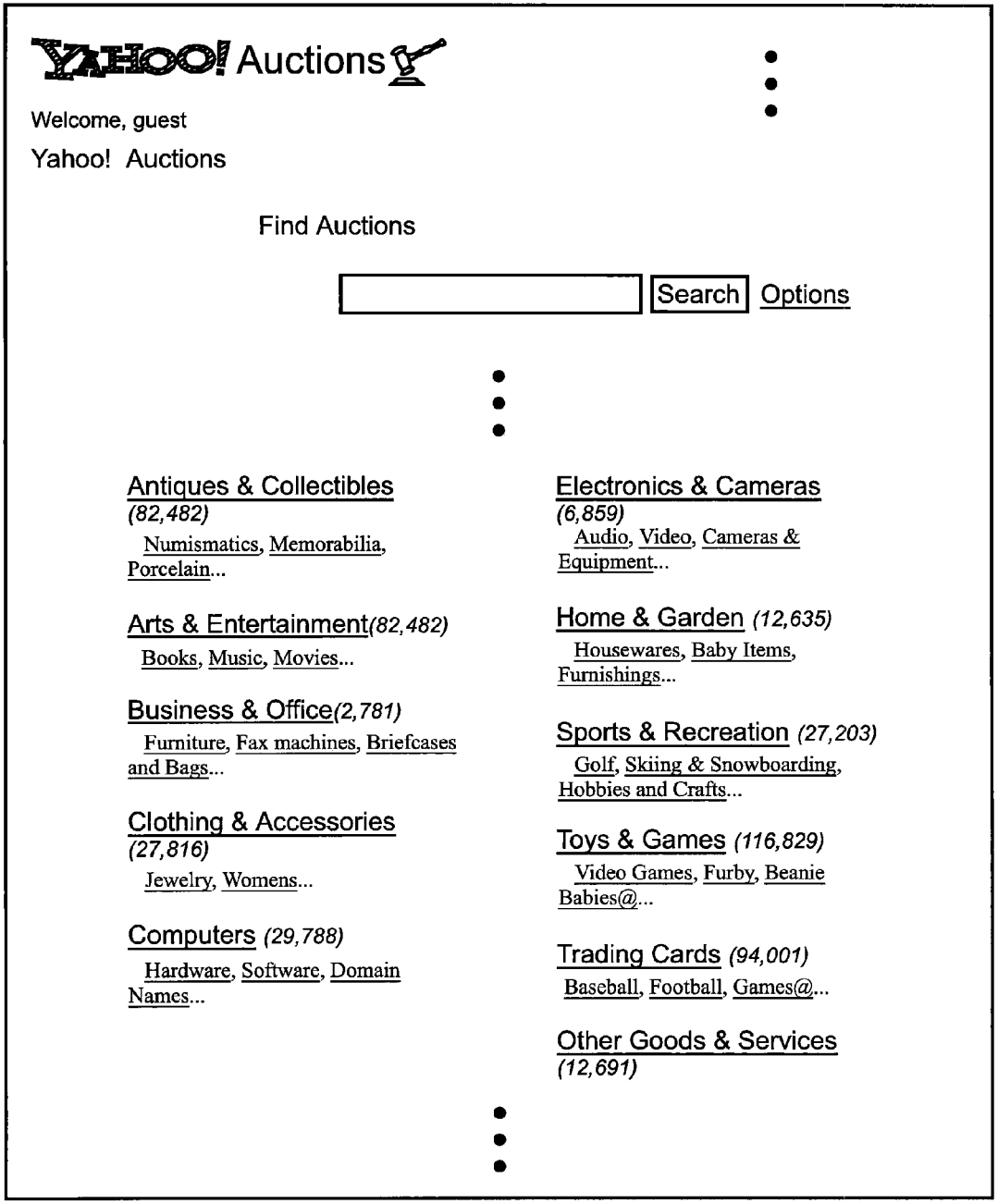
FIG. 2A is the home page with the 1st level category listings where, for example, "Antiques & Collectibles" is one of the several 1st level category listings displayed.
Figure 2B:
FIG. 2B lists 5 featured items on top of the page, and a total of 16 items in the "Living Room Set" category. The page is sent from the site server, when the "Living Room Set" category in "Furniture" category under "Antiques & Collectibles" category is clicked. The hierarchy of the category levels is displayed above the 5 featured items on the page.
Figure 3A:
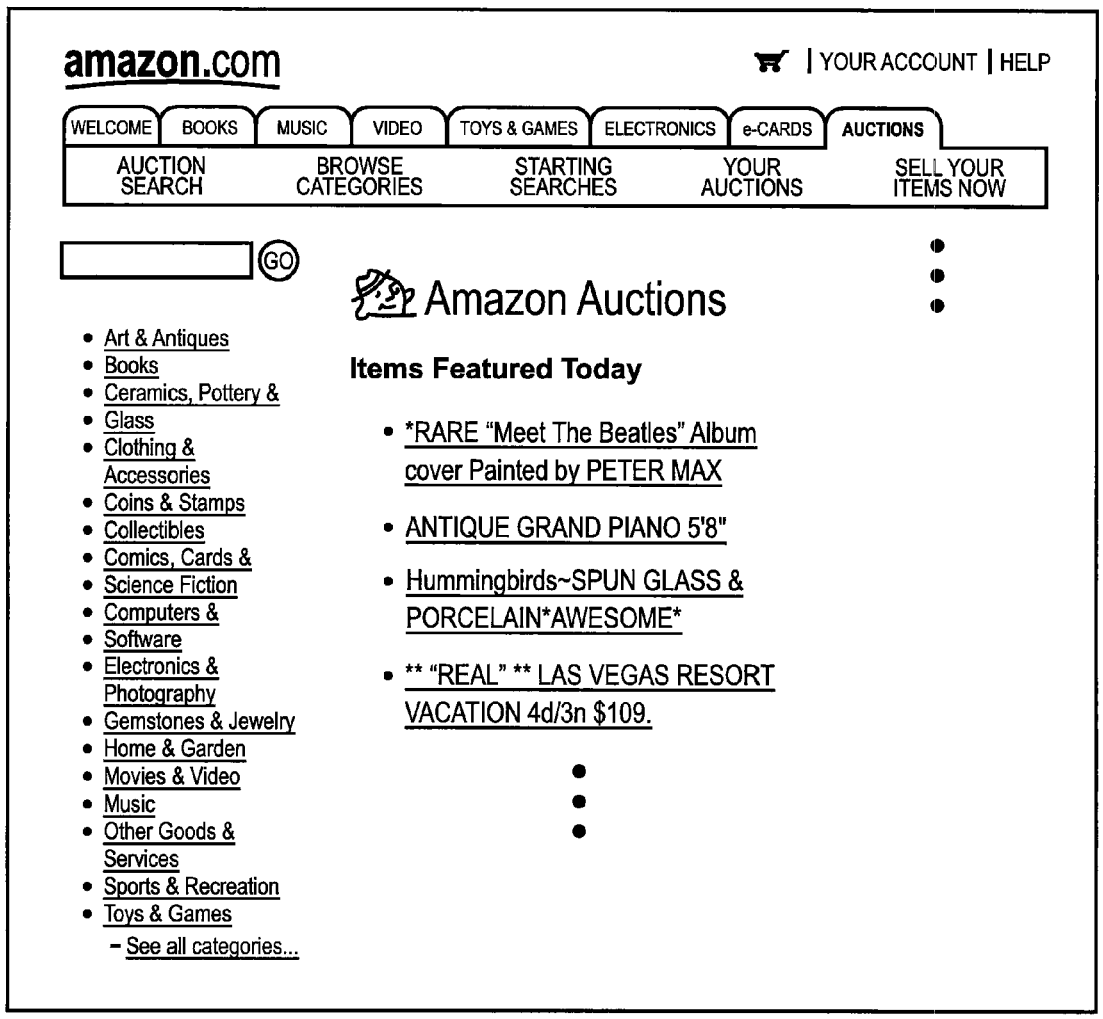
FIG. 3A is the home page, listing the 1st level categories on the left side, and 6 "featured" items in the middle of the page.
Figure 4A:
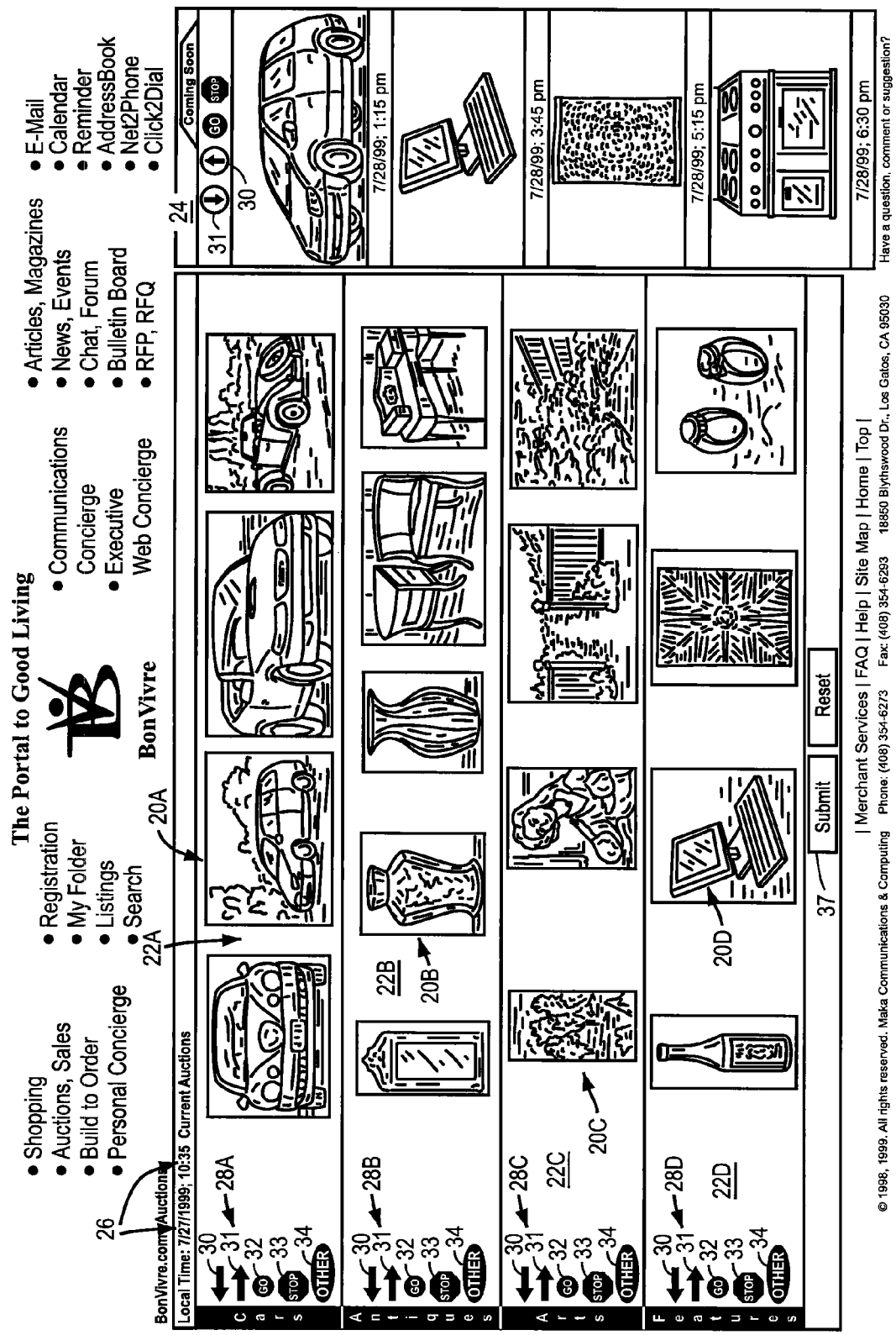
Figure 4B:
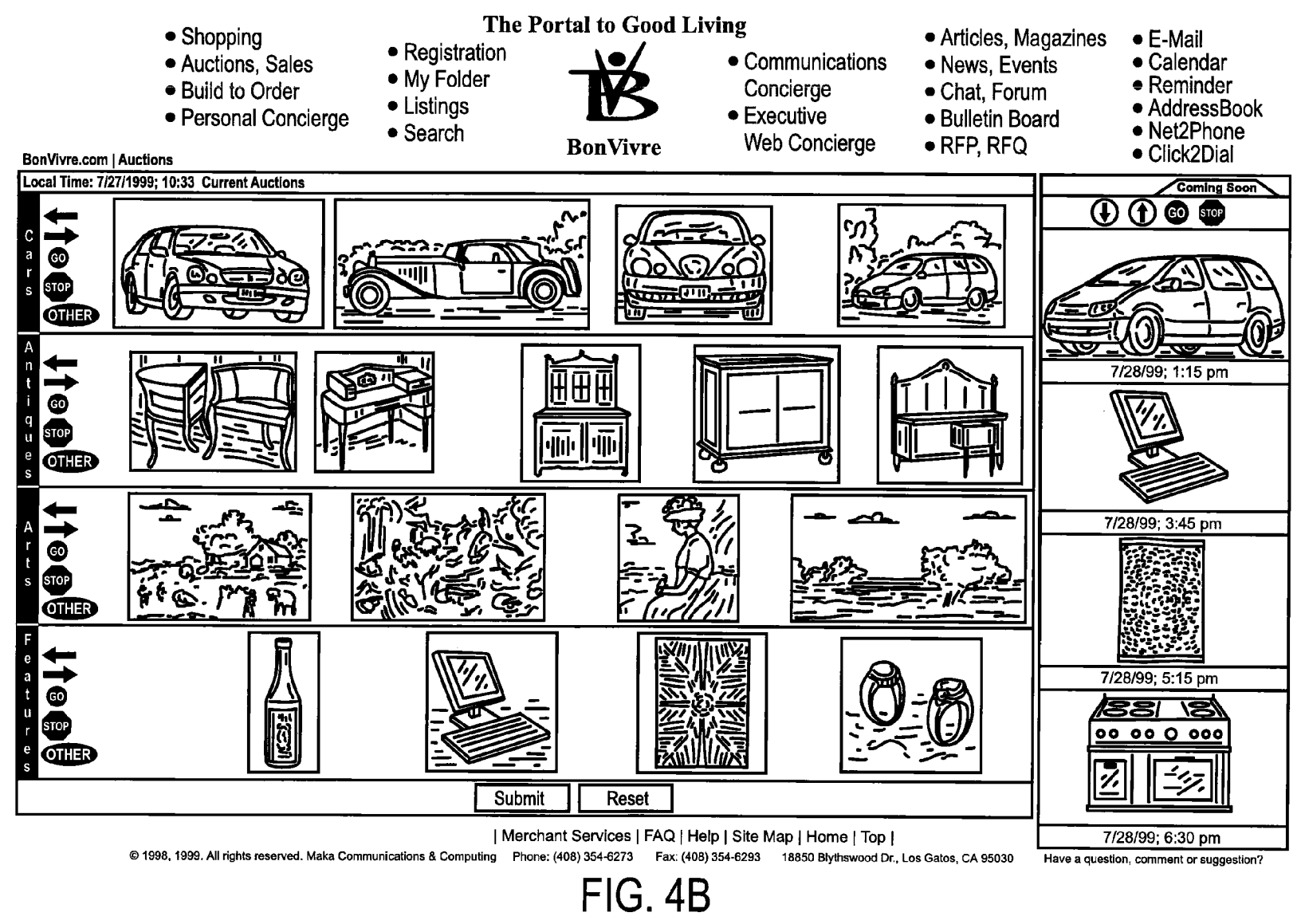
Figure 4C:
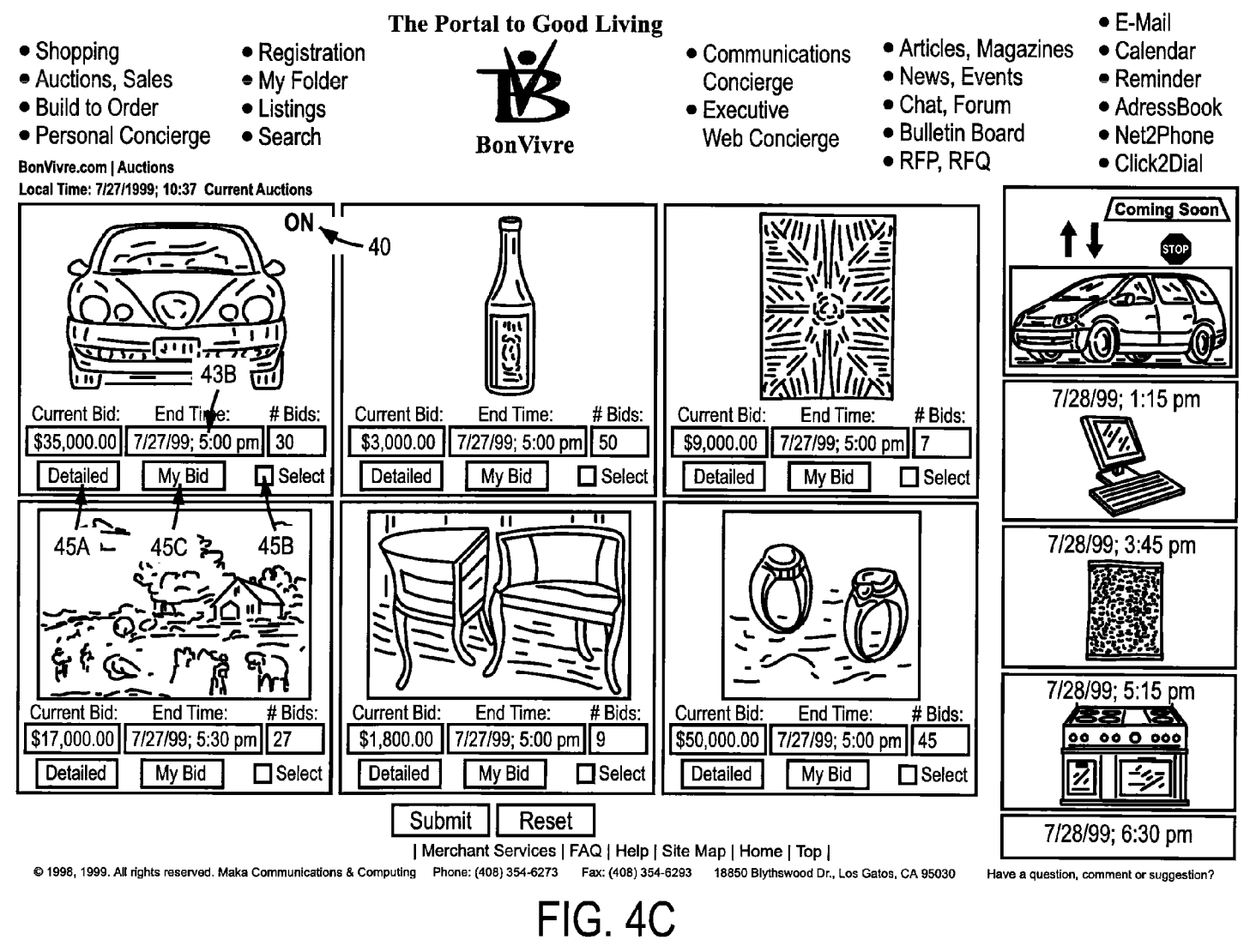

An example of an On-Line Auction presentation implemented with the current invention is illustrated in FIG. 4. FIG. 4A shows "search," or "category" browsing results, and the "featured" items in a graphical array, with multiple-select capabilities. The "upcoming" auctions are announced in a cycling or stationary (scrolled to view) margin-strip at the right side. The "present" auctions are presented in rows, and sorted in rows according to category criteria. A set of command buttons are placed at the left margin of each row to enable each row of the array to advance to the left, or back to the right by pressing the mouse button on the arrows, or to continually move for showing more items beyond the screen by clicking on the "GO" button, or stop at command by clicking on the "STOP" button. The "Other" button allows the viewer to select to view items from other categorization. The "upcoming" column on the right has similar functions. The movement for the column is up-down movement instead of the left-right for the rows of "present auctions."

In this particular presentation example, we have chosen 3 categories and the "featured." items for the rows. Other criteria can be used, such as displaying subcategory items from the same category, for example, sports cars of different manufacturer, or displaying same category items sorting by ending time, etc.

Each item on the array is selectable. The viewer can select as many items from the array as desired for monitoring, for detailed information, or for bidding. When the selection process is completed, the viewer "submits" the selection by clicking the mouse button on the "Submit" button located at the bottom of the screen.

FIG. 4B shows the FIG. 4A screen at some later time. Due to exercising the moving functions, some items have changed positions on the array, some items have left the screen, and some items not shown in 4A appear on the screen.

FIG. 4C: Displays the viewer-selected items from 4A and 4B on a monitoring screen. The screen is automatically tracked/updated by synchronizing with the server data at user programmed or default intervals. Three-dimensional object that should be seen from all sides has an "On" button in a portion of its still image. Clicking the "ON" button turns on the Virtual Reality with automated rotation as well as mouse driven rotation features. The "ON" button can be replaced by "VR" or any other form that representing turning on "Virtual Reality." Detailed information for each monitored object can be called individually by clicking on the "Detailed" button, or selectively and collectively by clicking the "select" boxes, and submitting requests to the server after completing the selection process. The object positioning in the array can be sorted with various criteria at user request or default setting. The "alert" can also be programmed, for example, to surround "End Time" box with small blinking stars, or any other attention causing signal, to signal the end of "open" auction within 30 minutes (or an hour), and blinking red stars for "My bid" button when "my bid" is out bid.

Selecting objects monitored in screen 4C for viewing further detailed information and access-bidding apparatus collectively would bring the screen shown in FIG. 4D after submitting the selection. In this example, The Egli Ucelli landscape painting, the jaguar S-series, and the Algarve rug are selected. The jaguar has Virtual Reality presentation, activated by clicking on the "ON" button. The column in the middle are textual descriptions for the items, and the Auction bids column to the right is where the auction status is presented, updated, and where bids can be entered. The membership ID number only has to be entered once. The scroll bars indicates there is more information in the box than what is shown. When the cursor is moved into the frame, where only partial information is shown, the full frame would pop-up.

FIG. 5: Shows an example of the "Live" Auction Format of the Present Invention. The 2 boxes at left are real-time, live streaming, broadcasting, or narrowcasting of live scenes at the physical auctions. The upper portion of the second column from the left displays either still image of a 2-D object, or still image of a 3-D object, with Virtual Reality option upon clicking on the still image. The upper portion of the 3rd column includes bidding screen and description screen. The lower portion displays the next item to be auctioned, and the right column displays the upcoming objects after the next auction in their time order. Bringing the cursor onto an image, the brief description is shown in a floating box. Clicking on the image brings detailed descriptions.

The present invention is implemented using software which can be written in many programming languages, or implemented with many web-page generation tools. The present invention can be used on a global or local computer network, on a personal computer, on viewable storage media such as a CD ROM, on a wireless telephone, on a wireless personal assistant such as a Palm Pilot®, or on any type of wired or wireless device that enables digitally stored information to be viewed on a display device. Also, information displayed and viewed using the present invention can be printed, stored to other storage medium, and electronically mailed to third parties.

Numerous modifications to and alternative embodiments of the present invention will be apparent to those skilled to the art in view of the foregoing description. Accordingly, this description is to be construed as illustrative only and is for the purpose of teaching those skilled in the art the best node of carrying out the invention. Details of the structure may be varied substantially without departing from the spirit of the invention and the exclusive use of all modifications which come within the scope of the appended claims is reserved.

What is claimed is:

1. A computer-implemented method for displaying digital information, comprising:
    in a computer with a processor and memory, performing the following:
    displaying on a display device, a two dimensional array of digital information elements;
    enabling a user make a selection of a selected digital information element from the digital information elements;
    in response to the selection, displaying on the display device additional information about the item represented by the selected digital information element, wherein the additional information includes at least one of: a link to buy and a link to bid on the item represented by the selected digital information element;
    performing at least an action to change appearance on the display device of at least a subset of the digital information elements in the array;
    removing from the array, in response to an occurrence of at least one of a plurality of user-programmed criteria, a selected digital information element, wherein at least one of the plurality of user-programmed criteria includes at least one of: a change in price beyond a pre-determined limit and expiration of a time duration preset for an item represented by a selected digital information element;
    storing the removed digital information element in a retrievable location;
    receiving a selection of the removed digital information element; and
    displaying the removed digital information element in a separate display area from the array of digital information element.

2. The computer-implemented method of claim 1, wherein the separate display area corresponds to a row or column apart that is separate from the array.

3. The computer-implemented method of claim 1, wherein the array of digital information elements are provided from an auction site.

4. The computer-implemented method of claim 1, wherein the array of digital information elements are provided from multiple auction sites.

5. The computer-implemented method of claim 1, wherein the array of digital information elements represent merchandise objects of different categories.

* * * * *